Figure 1:
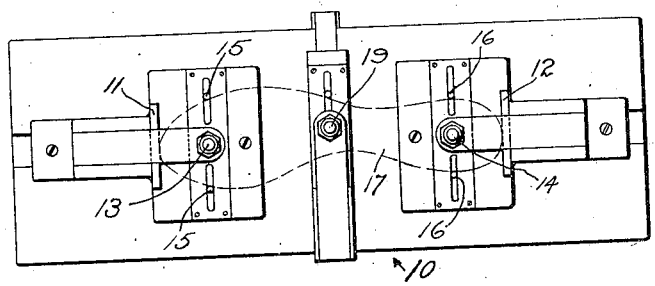

Dec. 2, 1924.  1,517,973

M. E. FERNALD

METHOD OF ASSEMBLING

Filed Sept. 13, 1922  2 Sheets-Sheet 1

Inventor
Mark E. Fernald
by Charles W. McDermott
his attorney

Dec. 2, 1924.                                                      1,517,973
M. E. FERNALD
METHOD OF ASSEMBLING
Filed Sept. 13, 1922                    2 Sheets-Sheet 2

Inventor
Mark E. Fernald
by Charles W. McDermott
his attorney

Patented Dec. 2, 1924.

1,517,973

UNITED STATES PATENT OFFICE.

MARK E. FERNALD, OF SOUTHBORO, MASSACHUSETTS, ASSIGNOR TO C. C. BLAKE, INCORPORATED, OF BOSTON, MASSACHUSETTS, A CORPORATION OF NEW YORK.

METHOD OF ASSEMBLING.

Application filed September 13, 1922. Serial No. 587,939.

*To all whom it may concern:*

Be it known that I, MARK E. FERNALD, a citizen of the United States, residing at Southboro, in the county of Worcester and State of Massachusetts, have invented certain new and useful Improvements in Methods of Assembling, of which the following is a specification.

This invention relates to a method of assembling work relative to a leader used in automatic shoe machinery for controlling the relative traverse of the work and tools to transfer the point of operation of the tools around the work. In such machines it is requisite that the work be initially positioned in the machine in proper relation to the operating tools and to the leader so that the mechanism for controlling the relative traverse of the work and tools may operate at the proper times to swing the work and tools in the proper direction and to the desired extent to maintain the edge of the work adjacent the tools in the line of feed.

In one type of automatic shoe machine the leader has an outline corresponding to the path which the tools are to traverse on the work. Inasmuch as nearly all the important shoe making operations require the tools to operate in or parallel to the edge or margin of the shoe sole, the leader usually must have a contour like the outline of a shoe sole, or of the last bottom. The usual arrangement requires the supporting of the work on a jack so accurately assembled with the leader that the tools, when compelled to follow substantially the outline of the leader through suitable mechanism, will perfectly perform the required operation on the work.

The object of the present invention is to provide a method of assembling the work and leader, to secure a relative positioning thereof that insures an accurate operation of the tools of the automatic machine at the point on the work and in the manner required for perfect shoe making.

To accomplish this object it is of extreme importance that the work, when of sole-shaped outline and superposed above the leader, be so positioned that its outline or contour if projected on the plane of the leader will coincide or be concentric with the outline or guiding contour of the leader.

The present invention provides a novel method that solves this problem, the preferred manner of practicing which is hereinafter described and then defined in the appended claims.

The practice of the method is facilitated by the use of apparatus which will assist the operative in locating the leader on a leader support and the work on a jack, and finally the jacked work on the leader. As illustrative of apparatus that may be employed to practice the invention with facility and rapidity, a diagrammatic representation is given of the essential features of the apparatus disclosed in applicant's copending applications, Ser. Nos. 587,940 and 587,941, filed of even date herewith.

Figure 2:
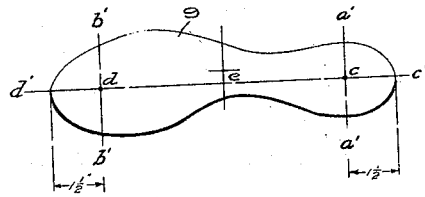
Figure 3:
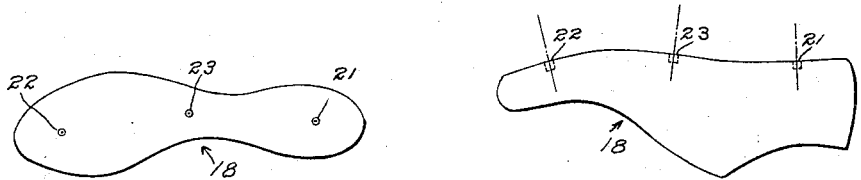
Figure 4:
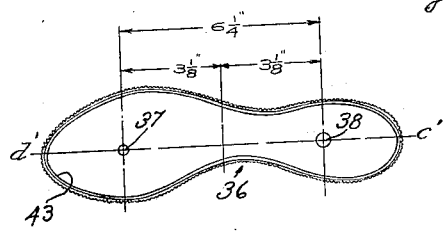
Figures 5, 6:
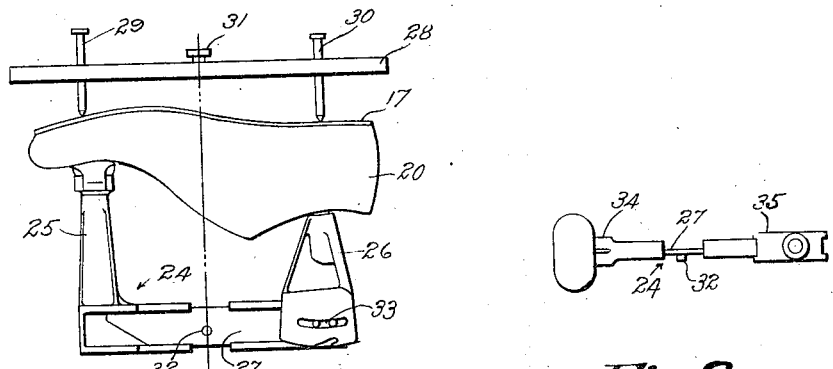
Figure 7:
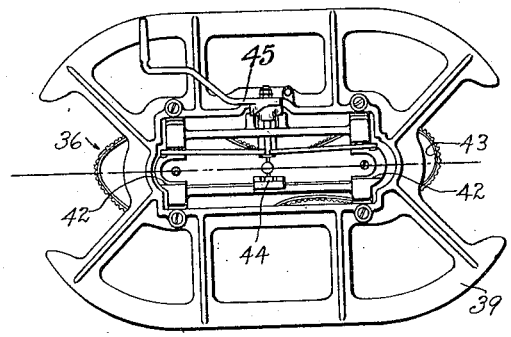
Figure 8:
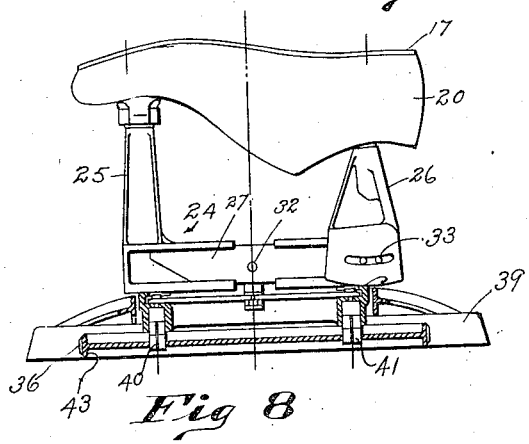

The novel method will be explained with the assistance of the accompanying drawings, in which:

Figure 1 is a view, in plan, of sole marking apparatus; Fig. 2 is a view, in plan, of the master insole pattern with lay-lines shown thereon; Fig. 3 is a view of a last, in both plan and side elevation marked to receive the insole of Fig. 2; Fig. 4 is a view, in plan, of a leader having a sole-shaped guiding contour; Fig. 5 is a view, in side elevation of apparatus for locating the last, or last and insole, on a jack; Fig. 6 is a plan view of the jack showing the gage devices; Fig. 7 is a view, in plan, of the skate for supporting the leader; and Fig. 8 is a view, in elevation of the work on the jack assembled with the leader on the skate.

The principle of the present method depends upon providing the work, for example an insole, and the leader with certain locating or positioning marks which, in each case, bear a known and definite relation to preselected points on the edge of the insole and the guiding contour of the leader, it being remembered that the outline of the leader and the insole are alike. After the work and leader have been so marked or prepared, these markings or indications are used in co-operation with appropriate gaging devices to instantly and accurately superpose the work on the leader in the position heretofore described as requisite.

In making one type of shoe on automatic machinery a master pattern is prepared having thereon two marks, one at each end, each of which lies on a preselected longitudinal datum line and each of which is at the same distance from its respective end of the master pattern. The longitudinal datum line is determined in the following manner. The master pattern 9 (Fig. 2) is laid between parallel gages which lie tangent to the ends of the insole. Parallel lines $a'—a'$ and $b'—b'$ are then drawn across the heel and toe portions, respectively, of the pattern parallel also to the end gages and at an arbitrary distance therefrom. In practice it has been determined that a distance of 1½" between the transverse lines $a'—a'$, $b'—b'$ and the ends of the pattern gives accurate results when practicing the present method. These transverse lines, between the edges of the pattern, are then bisected giving the central points $c$ and $d$. The longitudinal line $c'—d'$ is the datum line on which the heel and toe marks $c$, $d$ of all insoles, regardless of size or style, are placed, and these marks are used in the manner hereinafter set forth to position the insole on the leader.

In order to quickly provide insoles of varying sizes and styles with the marks $c$ and $d$, the sole marking apparatus 10 of my co-pending application, Ser. No. 587,940 of even date herewith, is used, a plan view of which is shown diagrammatically by Fig. 1. In said figure, 11 and 12 are the parallel end gages and 13 and 14 are marking prickers for the toe and heel, respectively, each located 1½" from its end gage. Associated with each prick point are edge gages, a pair 15 for the point 13 and a pair 16 for the point 14, the axial line of each pair being parallel to the end gages 11 and 12 and also 1½" therefrom. When an insole 17 is placed in this apparatus the end and side gages and associated prick point at each end are moved as a unit until the ends of the insole are engaged, whereupon the side gages act to center the insole relative to the prick points. A blow on each prick point will then mark the insole at $c$ and $d$ as on the master insole pattern.

The last bottom is prepared to receive the insole, marked as above, in the following manner. The master insole pattern is laid accurately on the bottom of a master last 18 (Fig. 3) of the same size and style and the last bottom then has the marks $c$, $d$ transferred to it by means of any suitable tool. It is preferred to provide the insole with a central mark $e$ by means of a central prick point 19 on the sole marking machine and in Fig. 3 this central mark is shown as having been transferred to the last bottom. The master last 18 thus produced is used to set the adjustable gaging devices of a last holding jig so that when shoe making lasts 20 of the same size and style are placed in the jig their bottoms may be drilled at the points $c$, $d$ and $e$ for the reception of nail-holding bushings 21, 22 and 23 of approved design, which bushings stand normal to the surface of the last bottom at the points where the bores for their reception are made.

A marked insole 17 may be instantly and accurately assembled on its last 20, with its edge coinciding with the edge of the last bottom if previously dinked to size, by driving nails through the insole at the points $c$, $d$ and $e$ and into the last bushings 21, 22 and 23 respectively. The nail in the bushing 23 draws the waist of the insole to the shank of the last and the insole thus conforms perfectly to the reverse curvatures of the last bottom.

Assuming that an operation is to be performed on the insole 17 by an automatic machine, the last 20 having said insole on its bottom is mounted on a saddle and spindle type jack 24 (Fig. 5) the toe and heel posts 25 and 26 of which are relatively movable on a base bar 27. The jack and work are brought to a centering device comprising a frame 28 carrying a pair of pointers 29 and 30 movable equally and oppositely by any suitable mechanism from a central point 31. The jack is so mounted that a positioning and gaging pin 32 projecting laterally from the base bar 27 is directly below the central point 31. The pointers are set to a distance apart equal to the distance between the nails driven through the marks $c$ and $d$ on the insole and the last is then shifted on the jack, by moving the toe and heel posts on the base bar, until the two nails at $c$ and $d$ register with the pointers. The gaging pin 32 is now central of the points $c$ and $d$ and the toe and heel posts are locked on the base bar by some convenient form of self-contained locking mechanism indicated at 33. The mounting of the jack is such that the side faces 34 and 35 of the housings at the lower ends of the toe and heel posts lie in a vertical plane parallel to the vertical plane which contains the longitudinal datum line through the points $c$ and $d$. These surfaces 34 and 35 are utilized to gage the lateral position of the work in a manner presently to be described. The jacked work is now ready for assembly with the leader.

Each automatic machine is provided with a leader 36, (Fig. 4) of the type illustrated in my co-pending application Ser. No. 541,246 filed March 4, 1922, which is provided with jig holes 37 and 38 drilled on a longitudinal datum line of the leader which is a counterpart of the same line on the insole. Practice has determined that the jig holes 37 and 38 be spaced 6¼" apart, each 3⅛" from the longitudinal center of the leader. Accordingly the leader support, in the form of a skate 39, is provided with leader holding bushings 40 and 41, also 6¼" apart, for entering the jig holes, as disclosed in my application, Ser. No. 587,941 of even date herewith. The skate is provided with a central frame for receiving the jack 24 having a longitudinal gaging wall 42, so related to the vertical plane of the axes of the leader bushings 40 and 41, that when the jack gaging surfaces 34 and 35 are engaged therewith the longitudinal datum lines of the insole and leader will be in the same vertical plane. In order to exactly superpose the edge of the insole over the guiding flange 43 of the leader the gaging wall 42 is provided with a centering notch 44, situated midway between the bushings, for receiving the centering pin 32 carried by the jack. The insole is thus accurately located, both laterally and longitudinally, above the leader without the exercise of any great degree of skill and is held in such position by a suitable locking device 45.

It will be observed that, when an operation such as rounding the insole is to be performed, the oversized insole need not be assembled on the last bottom until after the jack is mounted on the skate, since the nail holding the bushings in the last may be utilized to co-operate with the pointers in adjusting the position of the last relative to the centering pin of the jack. This is likewise true for some other operations on the insole. In like manner, for a certain type of shoe the last itself is provided with a marginal bottom shoulder, and in performing this shouldering operation the work would consist of the last itself.

The great advantage in the saving of time and labor which accrues from practicing the method of assembling the work and leader hereinbefore described will be apparent to those skilled in the art. Since each automatic machine for performing a distinct operation on the shoe is provided with a leader-carrying skate having the gaging elements comprising the wall 42 and notch 44, and since the position of the work relative to the jack centering pin 32 is fixed, it is merely necessary in advancing the work from one machine to another to release the jack from the skate and take only the jacked work from the machine. The repositioning of the work relative to the leader of the next machine is an instantaneous operation requiring merely an engagement of the pin 32 with its co-operating notch 44, and a movement of the locking lever on the skate in the proper direction.

In making shoes, using an upper provided with a box toe the toe end of the leader must be slightly modified from the exact shape of the insole to allow for the added thickness of upper materials thus introduced, but if the box toe is considered a part of the insole then, even in this type of shoe, the guiding contour of the leader is a counterpart of the contour of the edge of the work and such work is within the scope of the invention as defined by the appended claims.

Those skilled in the art will, of course, understand that the method of the present invention is entirely independent of the particular apparatus illustrated, which is shown merely as an exemplification of one manner in which the invention may be carried out conveniently.

Having thus described the invention and the preferred method of practicing it, it is definitely stated in its true scope in the following claims.

What is claimed as new, is:

1. In the process of making shoes by automatic machinery in which the relative traverse of the work on a jack and the tool is controlled by a sole-shaped leader having a guiding contour shaped as a counterpart of the edge of the insole to be incorporated in the shoe, the method of assembling the shoe with the periphery of its insole in vertical registry with said guiding contour of said leader which comprises; mounting the leader in the machine with the center of an arbitrarily selected longitudinal datum line in registry with a jack locating device on the leader support; locating an insole on a last by registering longitudinal datum lines of the insole and bottom of the last with each other, said lines being selected in the same manner as said leader datum line is selected; locating the last on a jack with the center of the longitudinal datum line of the last in registry with a jack locating device on the jack; and finally engaging said two jack locating devices whereby the insole is brought into superposed relation to the leader.

2. In the process of making shoes by automatic machinery in which the relative traverse of the work on a jack and the tool is controlled by a leader having a shape, in plan, which is a duplicate of the shape, in plan, of the work to be operated upon, the method of assembling the work and leader in superposed relation which comprises; locating the leader in a predetermined relation to a positioning point on the leader support; locating the work in the same relation to a positioning point on the jack; and then locating the jack on the leader support by registering one positioning point with the other.

3. In the process of making shoes by automatic machinery in which the relative traverse of the work on a jack and the tool is controlled by a leader having a contour like the outline of a shoe sole, the method of assembling work, having a similar contour, with said leader which comprises; making two marks on the work, one at each end, each bearing a definite relation to preselected points on its contour and each at the same distance from its respective end; mounting said work on a jack with the central point on a longitudinal line containing said marks in registry with a locating device on the jack; locating the leader on its support by registering a similarly determined central point with a jack locating device on the support; and finally assembling the jack and leader support by engaging one jack locating device with the other.

4. In the process of making shoes by automatic machinery in which the relative traverse of the work on a jack and the tool is controlled by a leader having a contour like the outline of a shoe sole, the method of assembling work, having a similar contour, with said leader which comprises; mounting the leader on a leader support in such position that an arbitrarily selected longitudinal datum line of the leader is parallel to a side gage on the support and centralized with respect to a jack locating device on the support; mounting said work on a jack with a like datum line of the work similarly related to a side gage and central locating device on the jack; and then mounting the jack on the leader support by engaging said gages and locating devices.

5. In the process of making shoes by automatic machinery in which the relative traverse of the work on a jack and the tool is controlled by a leader having a contour like the outline of a shoe sole, the method of assembling work, having a similar contour, with said leader which comprises; locating the leader on a leader support by engaging known points on the leader with points on the support symmetrically located with relation to a jack locating means on the support; locating the work on the jack by engaging known points on the work homologously related to the known points on the leader with devices symmetrically located with relation to jack locating means on the jack; and then superposing the work on the leader by engaging said jack locating means, one with the other.

MARK E. FERNALD.